United States Patent [19]

Hurtle

[11] 3,806,855
[45] Apr. 23, 1974

[54] VAPOR STATE CURRENT LIMITING DEVICE

[75] Inventor: Ralph Loyd Hurtle, West Hartford, Conn.

[73] Assignee: General Electric Company, New York, N.Y.

[22] Filed: Apr. 30, 1973

[21] Appl. No.: 355,693

[52] U.S. Cl.................. 337/114, 337/21, 337/121, 337/158
[51] Int. Cl. ............................................ H01h 87/00
[58] Field of Search ......... 174/17, 18, 21, 114, 121, 174/122, 158, 159

[56] References Cited
UNITED STATES PATENTS

| | | | |
|---|---|---|---|
| 3,117,203 | 1/1964 | Hurtle | 337/121 X |
| 3,501,730 | 3/1970 | Toshio Ito et al. | 337/114 X |
| 3,513,426 | 5/1970 | Inoue et al. | 337/114 UX |
| 3,599,137 | 8/1971 | Ito et al. | 337/114 X |
| 3,559,138 | 1/1971 | Itoh et al. | 337/21 |
| 3,611,041 | 10/1971 | Itoh et al. | 337/114 X |
| 3,611,237 | 10/1971 | Yamagata | 337/114 |
| 3,644,860 | 2/1972 | Yamagata et al. | 337/21 |
| 3,670,282 | 6/1972 | Itoh et al. | 337/21 |
| 3,735,309 | 5/1973 | Hurtle | 337/21 |
| 3,747,040 | 7/1973 | Inoue et al. | 337/21 X |

Primary Examiner—Bernard A. Gilheany
Assistant Examiner—A. T. Grimley
Attorney, Agent, or Firm—Robert A. Cahill; Philip L. Schlamp; Frank L. Neuhauser

[57] ABSTRACT

The invention relates to an improved vapor state current limiting device wherein a vaporizable conductive material providing circuit continuity between end terminals is accommodated in plural longitudinal channels formed at the interface of a ceramic insert and an encompassing ceramic sleeve.

8 Claims, 5 Drawing Figures

PATENTED APR 23 1974 3,806,855

3,806,855

VAPOR STATE CURRENT LIMITING DEVICE

BACKGROUND OF THE INVENTION

1. Field of the Invention

This invention relates generally to improved vapor state current limiting devices and more particularly to such devices which may be utilized with means for disconnecting or otherwise protecting electric load circuits and equipment.

2. Description of the Prior Art

Power networks are customarily provided with protective arrangements in the event the network is subjected to an overload or short circuit. One protective arrangement utilizes a resettable circuit breaker which opens to interrupt the circuit upon an overload or short circuit. As the current to be interrupted to increased, the circuit breaker may be subjected to destructive current magnitudes greater than the rating for which the circuit breaker is designed. To alleviate the problem presented by the potential destruction of a circuit by an overload or short circuit, the art has resorted to the inclusion of a current limiting device, or current limiter, in series with the circuit breaker. The current limiting device to which my attention is directed is of the non-destructive vapor state type wherein the current limiting device utilizes a conductive material which is capable of carrying a pre-determined amount of current without any substantial change in its electrical resistance or impedance properties. Upon being subjected to excessive current, the conductive material is vaporized, raising the resistance or impedance of the conductive material and reducing the current flow therethrough and thus the current flow in the series circuit wherein the current limiting device is connected. By thus limiting the overload or short circuit current, a circuit breaker of appropriate design, for the particular circuit, is protected against destruction by operating within its design parameters.

One vapor state type current limiter known in the prior art typically includes a housing which supports a pair of spaced apart electrical terminals for connecting the limiter in an electric circuit. A quantity of an electrically conductive fusible metal is disposed within the housing between the spaced terminals to permit the conduction of electricity therebetween. The fusible metal, which may be chosen from a number well known in the art, is chosen so that upon a current overload or short circuit, the fusible metal will vaporize and increase its electrical impedance or resistance to current passage therethrough. To control when this vaporization occurs, a ceramic insert, having a passage within it, is disposed in the housing between the ends of the terminals projecting into the housing. The fusible metal filling this passage thus forms a constricted, electrically conductive path through the insert. Pre-establishing the size of the constriction controls when vaporization is initiated so that the path resistance will increase in response to particular predetermined conditions.

The ceramic insert may be shorter than the length of the space in the housing within which the insert is disposed so that reservoirs of fusible metal are provided. Additionally, expansion means may be provided within the housing so that upon vaporization, the volume of the region within which the fusible metal is held can increase in response to increased pressure of the expanding fusible metal vapor.

My U.S. Pat. No. 3,117,203, issued Jan. 7, 1964, and assigned to the same assignee as the present invention, discloses a current limiter which employs a ceramic insert containing a plurality of internal passages extending axially within the insert. The embodiment of a plurality of such passages in a single insert is advantageous because of improved current limiting ability provided due to the fact that the plurality of passage provides increased surface area through which heat energy of the overload current may be dissipated upon vaporization. Since these passages are internally dispsoed within the body of the insert, upon vaporization of the fusible metal within the passages, the resulting pressure puts a tensile stress on the portion of the ceramic insert surrounding each passage. It is noted, however, that ceramics are weak in tension and strong in compression. Additionally, where internal passages are employed in the ceramic insert in such a current limiter, there may not tend to be a uniform radiation of heat from each passage. This is true where there is a centrally disposed passage and a plurality of passages surrounding that centrally disposed passage. If the heat is not radiated uniformly, the passage which is hottest will have the most resistance and carry the least current. It is desirable, however, that the current be substantially equally distributed so that the impedances or resistances along all of the passages substantially are the same whereby vaporization in all of them will occur simultaneously. Simultaneous vaporization is desirable because the effect of the accompanying pressure increases in each passage is neutralized with respect to the insert. If all passages are not subjected to substantially the same pressure, the insert may fail.

By this invention an improved cermaic insert for a current limiter is provided which is more resistant to pressure due to vaporization and is inherently more able to to uniformly radiate heat is disclosed.

It is therefore an object of this invention to provide in a current limiter, an improved ceramic insert which upon vaporization of a fusible metal disposed therein is subject to compressive rather than tensile stresses, and whose passages furthermore tend to radiate heat uniformly to ensure sumultaneous vaporization of the fusible metal associated herewith.

It is a further object of this invention to provide an improved ceramic insert in a current limiter, which ceramic insert includes a plurality of longitudinal channels disposed peripherally about the external surface thereof.

SUMMARY OF THE INVENTION

A current limiting device is disclosed which comprises a housing including an insulating wall defining a chamber therein. A pair of spaced electrical terminals are supported by the housing and disposed in communication with the chamber. An insulating body is disposed within the chamber in mating engagement with the insulating wall and positioned between the spaced terminals. The insulating body is formed such as to cooperate with the insulating wall to provide a plurality of channels extending axially of the body. An electrically conducting fusible metal, disposed in the passages, makes contact with and provides a plurality of electrically conductive paths between the spaced terminals. During conduction of an overload current along the passages, the overload current will cause the fusible metal to vaporize in the passages to increase the electrical resistance and thereby limit current conduction along the passages.

DESCRIPTION OF THE PREFERRED EMBODIMENT

Figure 1:
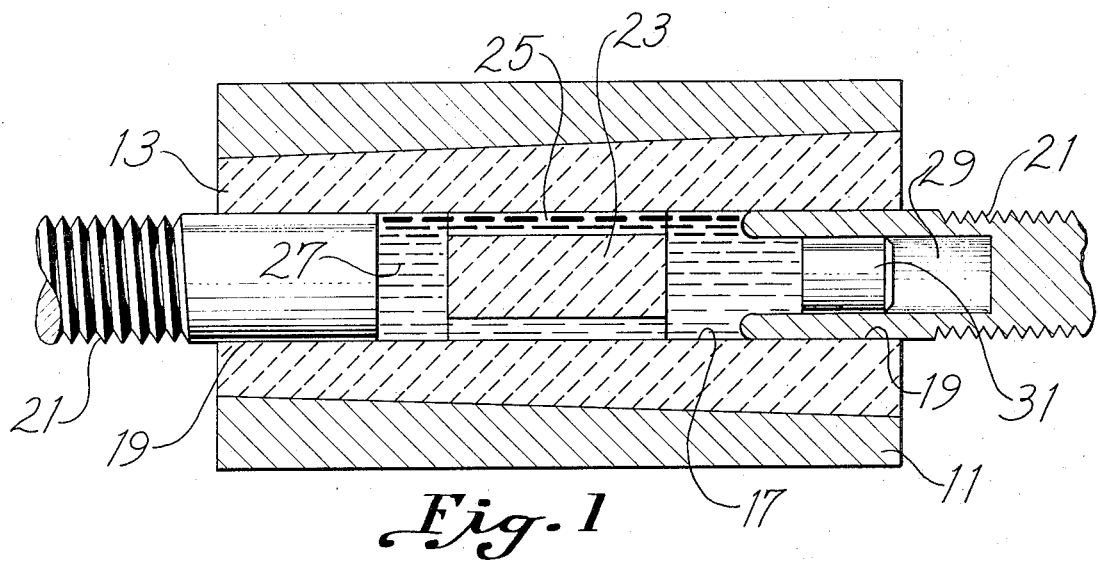
FIG. 1 is a longitudinal view of a vapor state current limiter constructed in accordance with one embodiment of my invention.

The current limiter seen in FIG. 1 comprises a tubular housing 11 within which is inserted an insulating ceramic liner 13. The inner wall of the ceramic liner 13 defines a chamber 17 in the interior of the housing. A pair of openings 19 located at opposite ends of the chamber provide access to the chamber for terminals 21, which terminals are supported therein, and which terminals are adapted to connect the current limiter to a circuit for which the current limiter is to provide current overload protection. It will be appreciated that suitable end caps (not shown) appropriately joined to the tubular housing 11, such as by screw threads, complete the housing and serve to insulatively mount terminals 21. An insert 23 is disposed in the chamber 17 between the inwardly projecting ends of the respective terminals 21. The insert, made of a ceramic material such as alumina, is formed with a plurality of longitudinally, semi-circular grooves 25 in its peripheral surface.

These grooves cooperate with the inner wall of ceramic liner 13 to provide passages to channels affording communication through chamber 17 between the respective terminals 21. A fusible metal 17 disposed in the chamber on either side of the insert, as well as in the passages 25, provides an electrically conductive path between the respective terminals 21. Optionally, an expansion chamber 29 may be provided in one of the terminals 21. A movable piston 31 is disposed within an open end of one of the terminals 21 fo axial movement along the length thereof to provide means by which the expanding volumes of vaporizing fusible metal may be accommodated in responce to an increase in pressure so as to protect the structural integrity of the limiter.

Figure 2:
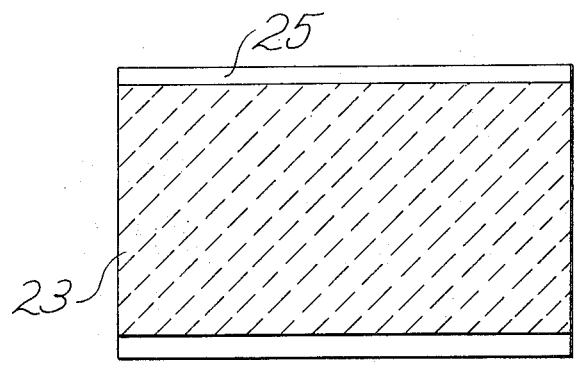
FIG. 2 is an enlarged longitudinal sectional view of the insulating ceramic insert incorporated in the current limiter of FIG. 1.
Figure 2A:
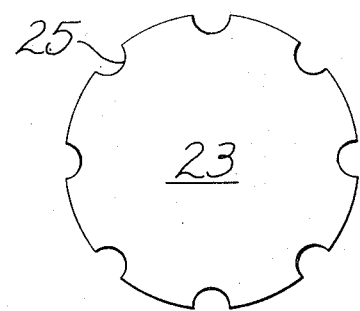
FIG. 2a is an end view of the ceramic insert of FIG. 2.

In the embodiment of my invention, seen in FIGS. 1, 2 and 2a, the improved insert 23 for a current limiting device or current limiter includes a plurality of channels or passages 25 (eight in the illustrated embodiment) extending axially along the length of the insert and arrayed around the interface between it and the ceramic liner 13. This location of passages 25 is highly advantageous because upon current overload and heating of the fusible metal in these constricted passages, vaporization of the metal will take place with a consequent increase in pressure proximate the passages. Becasue the passages are exterior to the insert, pressure will be exerted inwardly on the ceramic insert 23. Inward pressure on the ceramic insert will tend to put the ceramic materials proximate the passages in a compressive state. Since ceramic material is strong in compression and weak in tension, this is clearly an improvement over the prior art inserts utilized in current limiting devices.

To accommodate the outwardly directed pressures resulting from vaporization of the metal in the passages 25, the liner 13, preferably formed of the same ceramic material as insert 23, is pre-stressed into high compression. This may be accomplished in the illustrated embodiment of FIG. 1 by imparting slight complementary tapers to the outer diameter of liner 13 and the inner diameter of housing 11. Thus, upon assembly, the housing exerts a compressive force on the liner.

Consequently, the outwardly directed pressure resulting from metal vaporization in the passages 25 must first overcome the pre-stressed compressive pressure exerted by the housing 11 before the liner will experience any tensile stress. The construction illustrated in FIG. 1 has the additional advantage of affording economical housing design, since the magnitude of external pressure on a cylinder required to produce the desired pre-stressed compression at its inner wall decreases as the cylinder inner diameter increases. Thus by locating the passages in displaced relation to the axis of the insert 23, the insert itself is subjected only to compression, while the liner 13, being a relatively thin walled cylinder, can be efficiently pre-stressed in compression at its inner wall by housing 11.

Additionally, since the plurality of passages 25 are disposed only around the periphery of the insert, all the passages upon the vaporization of the fusible metal therein radiate heat in a substantially identical, uniform fashion. This is in contrast to prior art inserts having internal, radially overlapping passages which can not uniformly radiate heat. The consequence of uniform radiation of heat provided by my improved ceramic insert is advantgeous because, as noted above, such uniform heat radiation helps to ensure simultaneous vaporization of the fusible metal in the respective constructed passages of the current limiter.

It is desirable that the length and diameter of the channels 25 be properly related to one another to ensure proper operation of the current limiter. It has been found that a ratio of length/diameter equal to approximately 3 ensures proper operation. If the ratio is substantially less than 3, the axial cooling of the passage has been found to be excessive for the operating conditions usually desired during overload. If the ratio is much greater than 3, the power consumption while carrying normal current has been found to be high.

Figure 3:
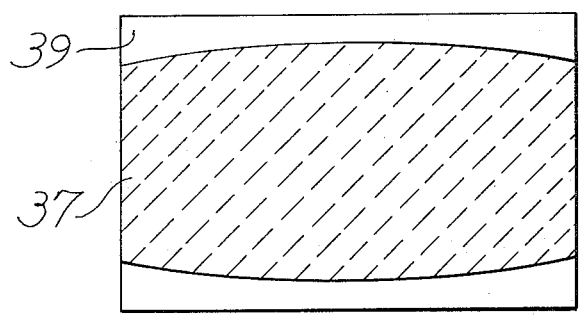
FIG. 3 is a longitudinal sectional view of a ceramic insert incorporating an alternate embodiment of the invention.
Figure 3A:
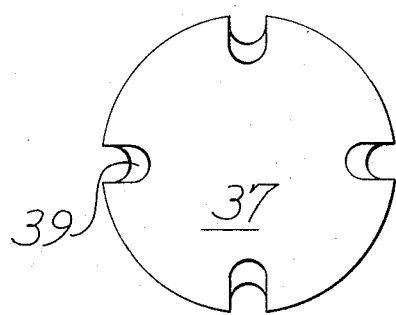
FIG. 3a is an end view of the ceramic insert of FIG. 3.

Another embodiment of the improved insert is shown in FIG. 3. Such an insert 37 is analogous to the insert 23 of FIG. 2, in that longitudinal grooves are formed in the insert peripheral surface. However, the grooves 39 of insert 37 are distinctive because they have, in effect, a bell-mouth shape. As shown in FIG. 3 and FIG. 3a the cross sectional area of the channels formed upon assembly with liner 13 (FIG. 1) is at a minimum proximate the central portion of their lengths. Moving toward either end of the channel, the cross sectional area of the bell-mouth increases to a maximum value. Consequently, the amount of fusible metal each channel can contain also increases. Altering the shape of the individual passages is effective to control the rate of heat flow from the passage so that the length of time that the circuit experiences a current overload of a particular value before vaporization occurs can be controlled. Heat generated by current overload will flow both radially into the surrounding ceramic material and axially along the passage. As the cross sectional area of the passages increases, more heat can be radiated axially so that less heat is available to vaporize the metal.

The disclosed ceramic inserts are also advantageous because they can be made less expensively than prior art inserts. The external passages may be molded into the insert at the time of initial formation. Prior art inserts have had their internal holes drilled after the insert has been initially formed. Thus, an additional operation is required in the forming of the prior art inserts.

Though ceramic inserts are known for vapor state current limiters, none of them suggests a structure of the type disclosed herein which insures structural integrity since the stresses induced in the ceramic insert are compressive in nature and the ceramic liner can be conveniently and efficiently pre-stressed in compression to withstand vaporization pressures. Furthermore, the uniform radiation of heat also ensures structural integrity. Finally, ease of manufacture of the disclosed insert is also advantageous over the prior art.

It will be appreciated that the passages may be formed of cross-sections other than those illustrated in FIGS. 2 and 3. Moreover, rather than forming the grooves in the insert periphery, the inner wall of liner 13 could be grooved to cooperate with a smooth or complementingly grooved insert periphery to provide the requisite passages. If desired, the insert may be mounted to present a smooth peripheral surface in closely spaced relation to the liner and thus form a single annular channel or passage. Moreover, the channel or channels may spiral in their extension along the axial insert length to increase their effective lengths.

Having thus disclosed my invention, I desire it understood that modifications from the specific embodiments shown will be obvious to those skilled in the art and I desire that the claims made herein be interpreted in the spirit and scope of the invention.

What is claimed as new and desired to be secured by Letters Patent of the United States is:

1. A current limiting device comprising:
    a housing including an insulating wall defining a chamber therein;
    a pair of spaced terminals supported by said housing and disposed in communication with said chamber;
    an insulating body disposed within said chamber between said spaced terminals;
    means forming at least one channel intermediate said body and said wall, said channel providing communication between said terminals through said chamber;
    an electrically conductive fusible metal disposed in said channel to provide an electricaly conductive path between said spaced terminals;
    whereby conduction of an overload current through said passage causes said fusible metal to vaporize in said passage to increase the electrical impedance to current conduction therethrough.

2. The current limiting device of claim 1, wherein said body and said wall are in interfacial engagement, and said forming means provides a plurality of spaced channels at the interface between said body and wall.

3. The current limiting device of claim 2, wherein said channel forming means is provided by spaced grooves in the peripheral surface of said body.

4. The current limiting device of claim 3, wherein said body and said wall are each formed of a ceramic material.

5. The current limiting device of claim 4, wherein said wall is constituted by a cylindrical ceramic liner, said housing including means to exert a force on said liner of a character to pre-stress the portion of said liner adjacent said interface in compression.

6. The current limiting device of claim 2 wherein the cross sectional area of each said channel measured from the peripheral surface of said insulating body varies along the channel length, from a minimum value proximate the midpoint of the channel length to a maximum value proximate at least one channel end.

7. The current limiting device of claim 2 wherein the cross sectional area of each said channel measured from the peripheral surface of said insulating body is substantially uniform along the length of each said respective channel.

8. The current limiting device of claim 2 wherein the ratio of channel length/channel diameter is approximately three.

* * * * *